United States Patent [19]
Watanabe et al.

[11] Patent Number: 6,128,320
[45] Date of Patent: Oct. 3, 2000

[54] COMMUNICATION STATUS CONFIRMATION SYSTEM USING USER DATA

[75] Inventors: Kazuko Watanabe, Tokyo; Kazunori Furukawa, Kawasaki, both of Japan

[73] Assignee: Fujitsu Limited, Kanagawa, Japan

[21] Appl. No.: 08/940,764

[22] Filed: Sep. 30, 1997

[30] Foreign Application Priority Data

Mar. 18, 1997 [JP] Japan ................................ 9-063994

[51] Int. Cl.⁷ ............................ G01R 31/08; H04L 72/28; H04J 3/12
[52] U.S. Cl. ............................ 370/522; 370/410; 370/236
[58] Field of Search ................................ 370/389, 392, 370/396, 397, 235, 236, 232, 252, 253, 245, 248, 522, 523, 410, 401, 400

[56] References Cited

U.S. PATENT DOCUMENTS 5,263,022  11/1993  Nobutoki et al. .................... 370/449
5,854,783  12/1998  Kaganor .............................. 370/232

FOREIGN PATENT DOCUMENTS 6-62055   3/1994  Japan .
6-152653  5/1994  Japan .

*Primary Examiner*—Chi H. Pham
*Assistant Examiner*—Brenda H. Pham
*Attorney, Agent, or Firm*—Helfgott & Karas, P.C.

[57] ABSTRACT

A communication status confirmation system in which not only a status on call establishment or link establishment but also a communication status of actual communication in an upper layer can be simply collected in a real time is provided.

A communication status confirmation system employing user data on a communication network having a plurality of data communication devices connected to a transmission path employing logical multiplexing method, wherein each of the plurality of data communication devices comprises first means for reading logical path information of a frame of user data, second means for storing a flag set per said logical path information, and third means for reading a status of the appropriate flag from said second means, and wherein data flowing in each communication path in said communication network is confirmed according to the flag information read from said first means.

10 Claims, 27 Drawing Sheets

FIG. 1

COMMUNICATION PATH INFORMATION =

| X | X | X | X | X | ... | X | X | X |
|---|---|---|---|---|---|---|---|---|
| 0 | 0 | 0 | 0 | ... | 0 | 0 | 0 |

FLAG

→ READING A COMMUNICATION ADDRESS ON PASSING A FRAME AND SETTING THE APPROPRIATE FLAG FROM "0" TO "1"

| X | X | X | X | X | ... | X | X | X |
|---|---|---|---|---|---|---|---|---|
| 1 | 1 | 0 | 1 | ... | 1 | 1 | 0 |

FLAG

FIG. 3

| NUMBER | DESTINATION ADDRESS | SENDER ADDRESS |
|---|---|---|
| 1 | xxxxxxxx | xxxxxxxx |
| 2 | xxxxxxxx | xxxxxxxx |
| . . . . . | . . . . . | . . . . . |

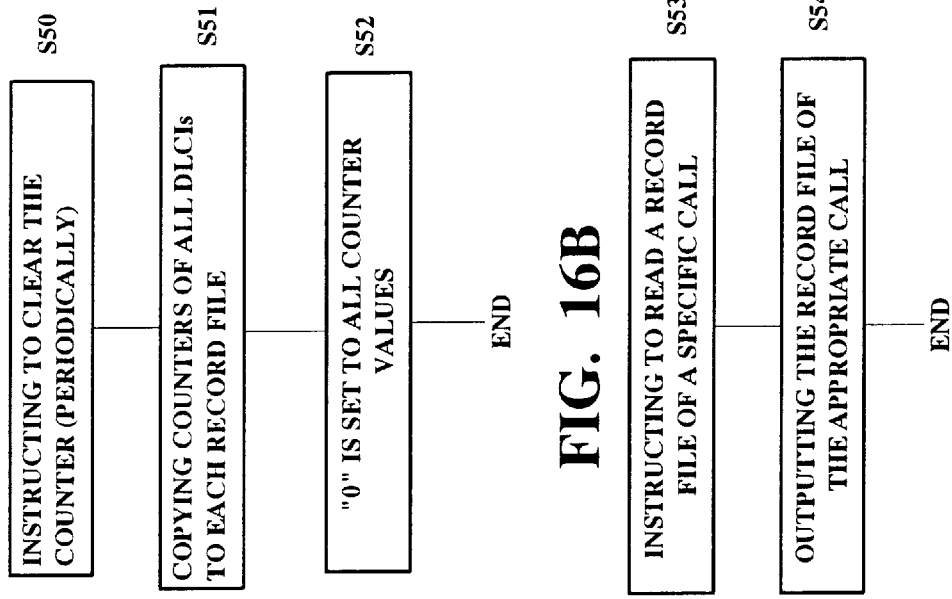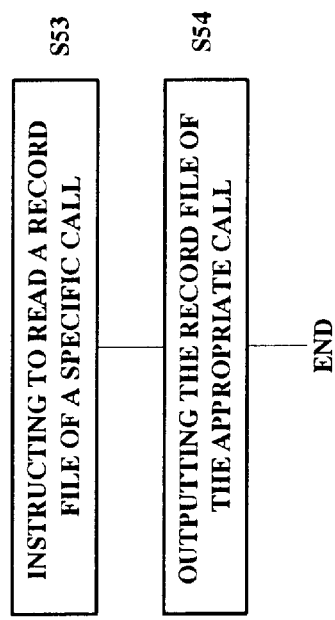

FIG. 19

| | A NUMBER OF PASSING FRAMES (DLCI = 5) |
|---|---|
| SWITCH 1 | 20 |
| SWITCH 2 | 3 |
| SWITCH 3 | 16 |
| SWITCH 4 | 18 |

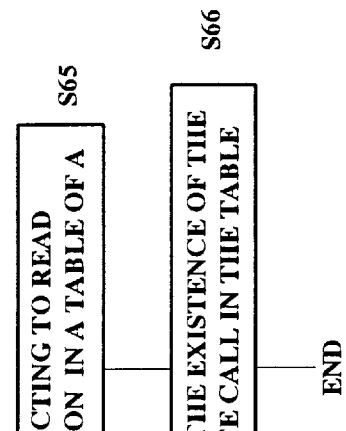
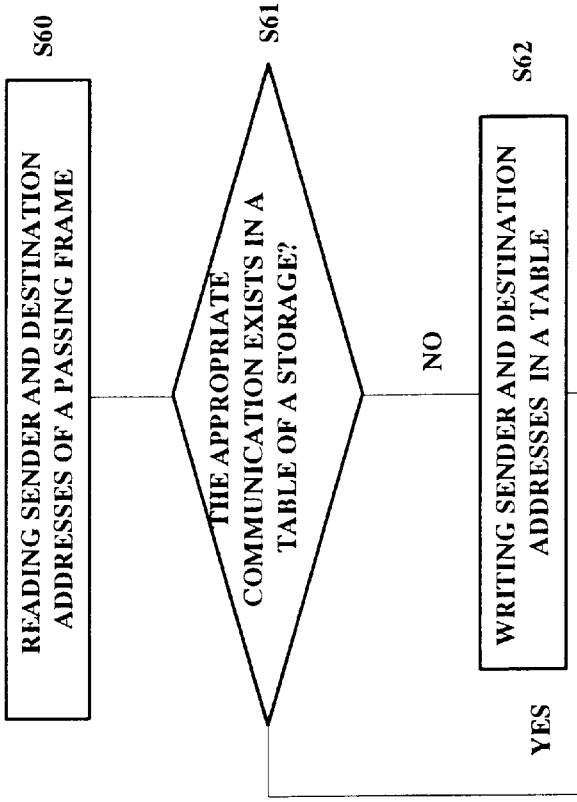
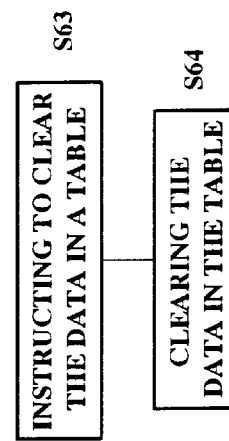

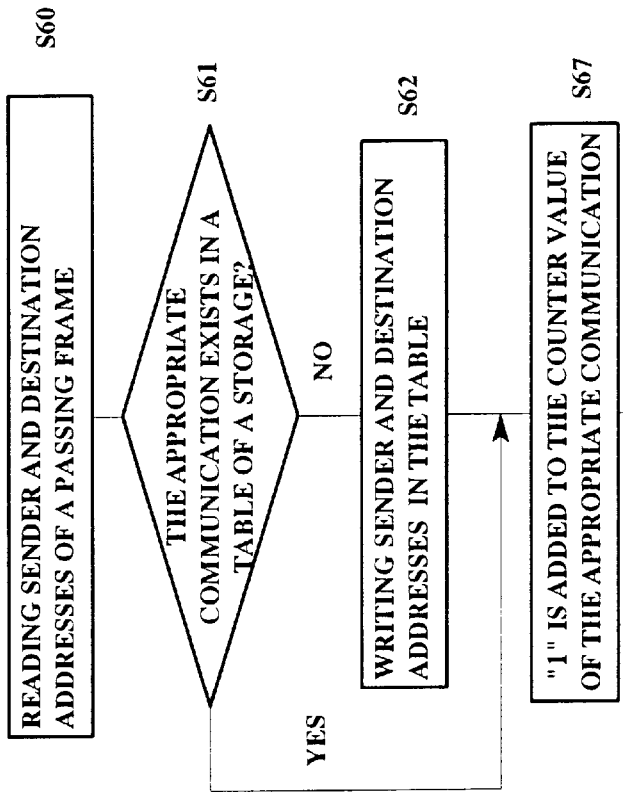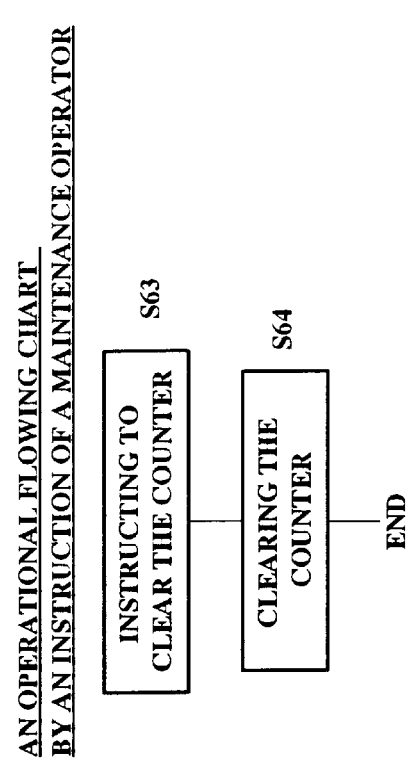
FIG. 23A
FIG. 23B
AN OPERATIONAL FLOWING CHART
BY AN INSTRUCTION OF A MAINTENANCE OPERATOR
FIG. 23C

FIG. 26

| | A NUMBER OF PASSING FRAMES | SENDER ADDRESS<br>DESTINATION ADDRESS | XXXXX (TERMINAL b)<br>XXXXX (TERMINAL c) |
|---|---|---|---|
| SWITCH A | 3 | ROUTER A | 20 |
| SWITCH B | 20 | ROUTER B | 18 |
| SWITCH C | 16 | ROUTER C | 0 |
| SWITCH D | 18 | — | — |

COMMUNICATION STATUS CONFIRMATION SYSTEM USING USER DATA

BACKGROUND OF THE INVENTION

1. Field of the Invention

The present invention relates to a system for obtaining communication statuses of calls passing through communication devices on a data communication network employing a logical multiplexing method in real time per a communication device.

2. Description of the Related Art

Needs for data communication network, as well as Internet, have a yearly increased. There is no particular prescription of a transmission path for a data communication network, and thus the network can be formed not only for wired communication, but for wireless or mobile communication.

In this condition, there is a great demand for easily analyzing faults and obtaining a communication status or a traffic of user data in a data communication device employing a logical multiplexing method structured with Local Area Network (LAN)—Wide Area Network (WAN)—LAN.

In here, a logical multiplexing method is defined as a method for multi-specifying a plurality of addresses by writing a destination address on a predetermined format and transmitting it via a transmission path.

A person who constructs and operates a network requires means for knowing not only physical condition of transmission lines but communication statuses of end users.

The person who operates a network further requires to continuously know whether or not data transmission between end users is performed as usual, as possible without deteriorating its communication performance for communication paths.

In a connection oriented communication on a data communication network employing a logical multiplexing method, it is possible to obtain only about call establishment status in a communication device. However, it is not possible to obtain the call communication status whether or not user data transmission is actually facilitated in an upper layer in real time.

Therefore, it has be performed to obtain the communication status by collecting and analyzing communication data with the use of a line tracing function, which may accumulate the communication data in the communication device.

In a connection-less communication, there is no means for obtaining a status of the communication path itself in a communication device, and therefore there is no way to know whether or not real data transmission is performed in normal. To cope with the above-described problem, the communication status as a counter measure for faults has been obtained by the function of collecting and analyzing the communication data of a device for analyzing data, such as an analyzer, connected to the network.

However, the conventional function for obtaining the data communication status has been used with the following limited condition or range.

In the line tracing function, the data communication status is obtained by recording all user frames per a line and querying information of the recorded frames to analyze. It is required for building this function in a communication device to have bulk memory capacity to record all frames and write data in the storage at a high speed.

It has been also required that a technical engineer who has a best knowledge of each data communication protocol and a frame structure should analyze data outputted by querying the communication data sequence.

It is not preferable to use this analyzing function because its cost is too expensive. Further it is not simple to connect this analyzer to other devices in the network. Additionally, all passing frames are indicated in detail and information analysis becomes difficult. That causes a requirement of an advanced analysis skill.

As described above, when employing the conventional means, such as the line tracing function as a means for obtaining communication status on a data communication network of a logic multiplexing type, it is required to have much memory capacity in a communication device. Because of that, it causes a problem not to immediately analyze the information.

When an analyzer is employed to cut and divide the communication for analyzing the faults, it takes too long time to cut communications for the faults. There is another problem that the analyzer is too expensive, and therefore, it costs too much to connect the analyzer to the network.

SUMMARY OF THE INVENTION

Accordingly, it is an object of the present invention to provide a communication status confirmation system in which not only a status of call establishment or link establishment condition but a communication status for showing actual communication in an upper layer can be easily collected in real time in a communication device.

It is another object of the present invention to provide a communication status confirmation system which can rapidly cope with faults and obtain a traffic condition in a network.

BREIF DESCRIPTION OF THE DRAWINGS

FIG. 1 is an explanatory diagram of a flag area in a storage of a switch.

FIG. 3 shows an example of contents of a table in a communication device.

Figure 10:
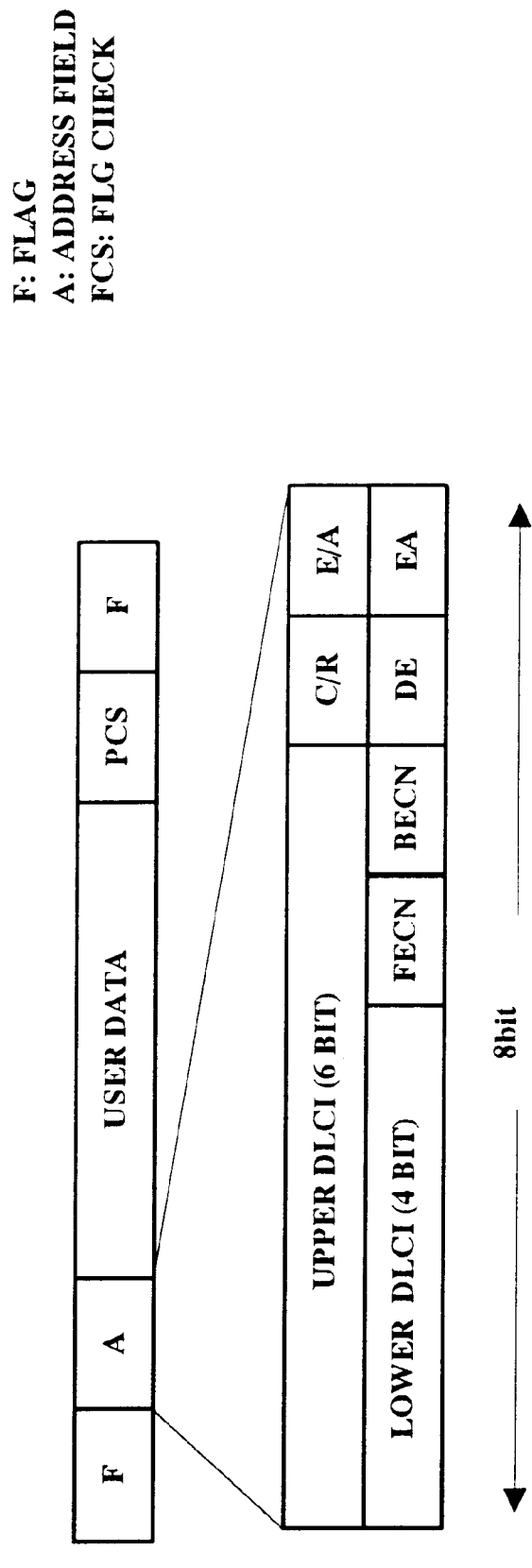

FIG. 10 explains a structure of a frame format of a frame relay.

Figure 8:
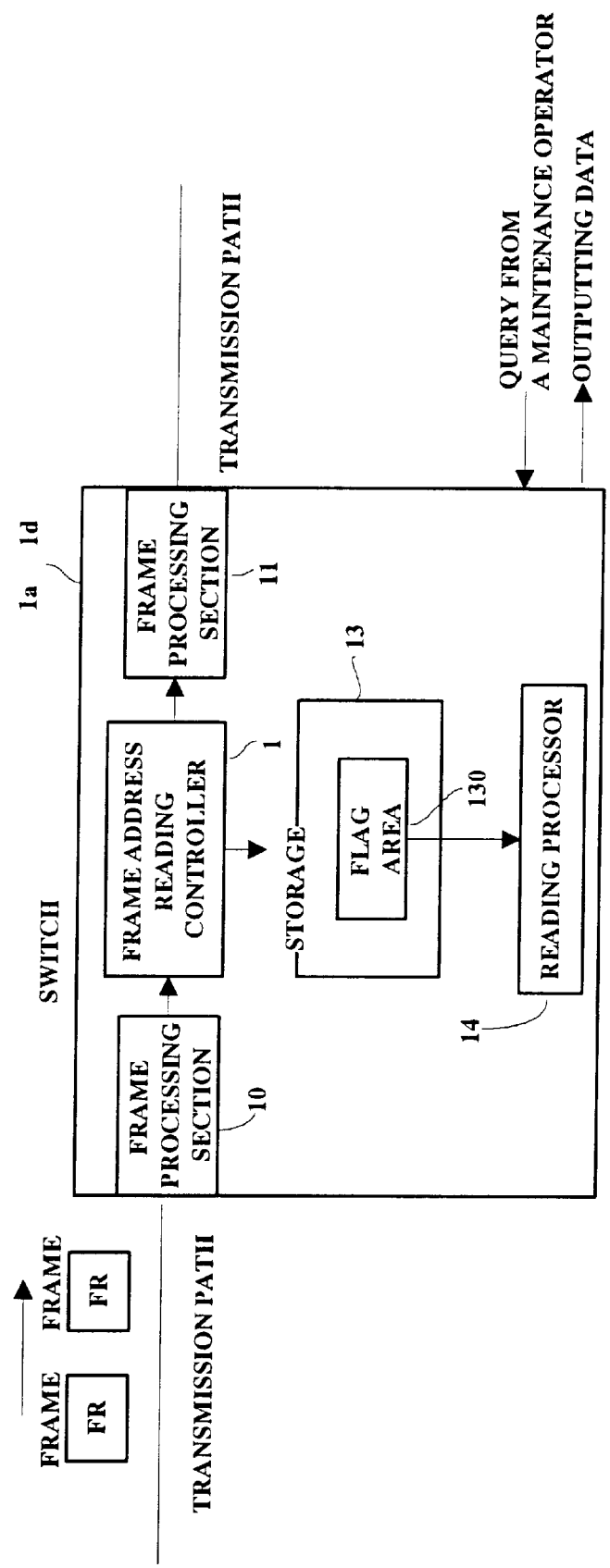
FIG. 8 shows a block diagram of a first structural example of a switch on a network illustrated in FIG. 7.
Figure 11C:
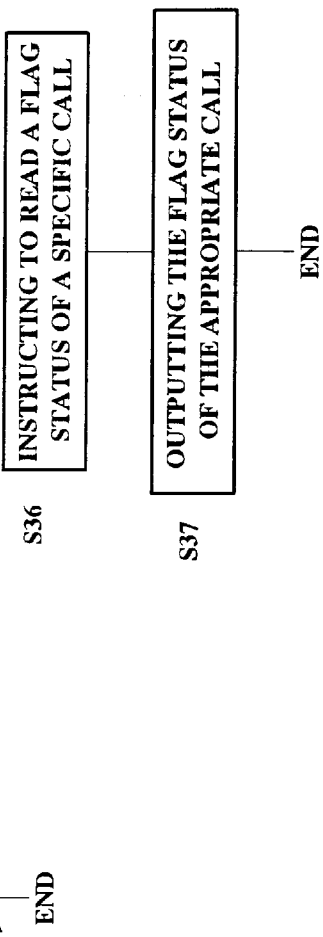
Figure 11A:
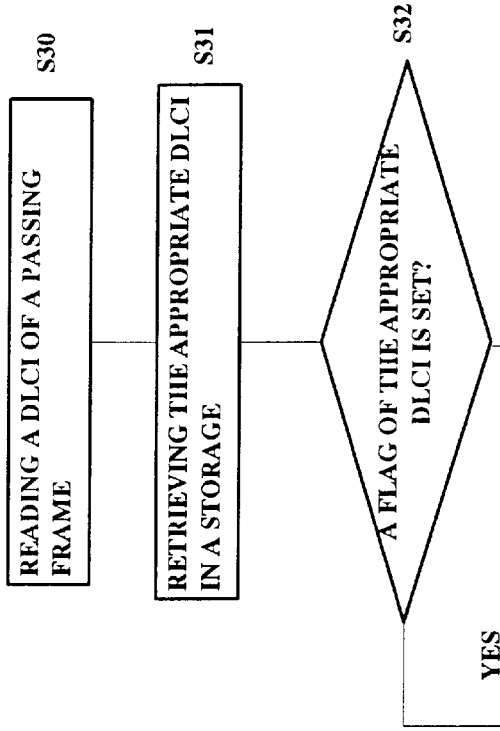
Figure 11B:
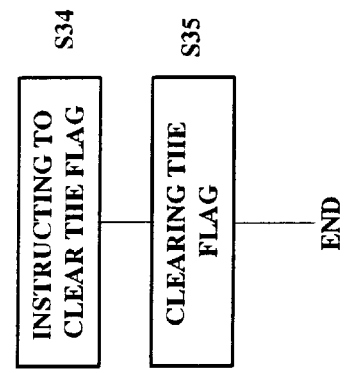

FIGS. 11A to 11C show operational flowing charts in a switch on a structure illustrated in FIG. 8.

Figure 7:
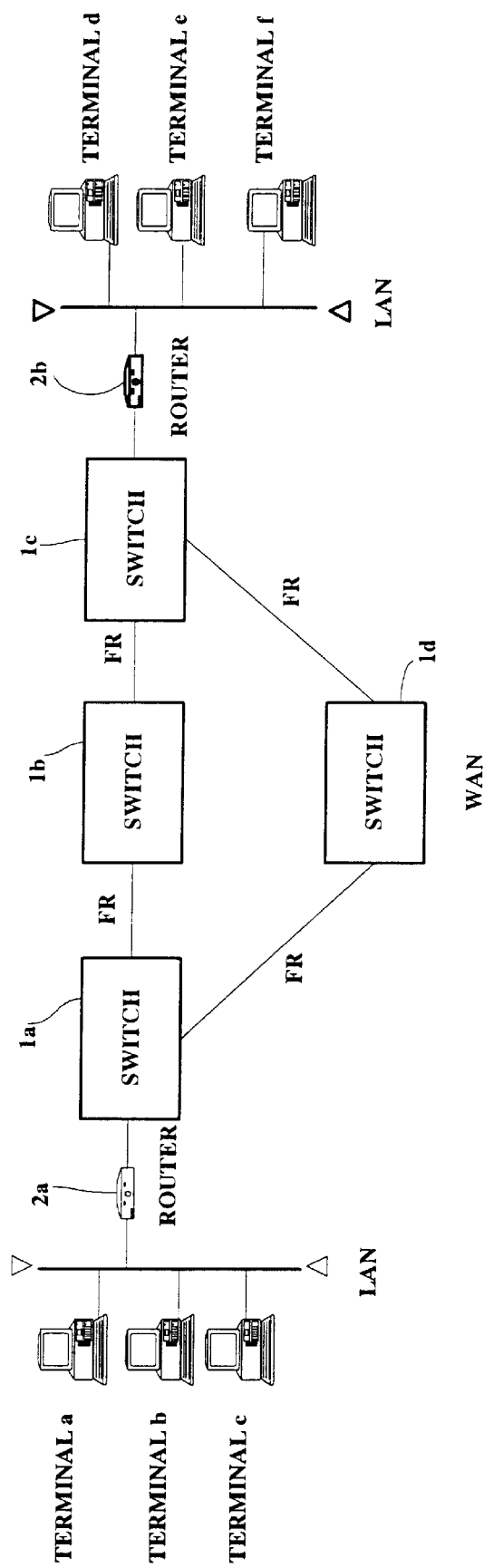
FIG. 7 illustrates a structural example of a data communication network.
Figure 12:
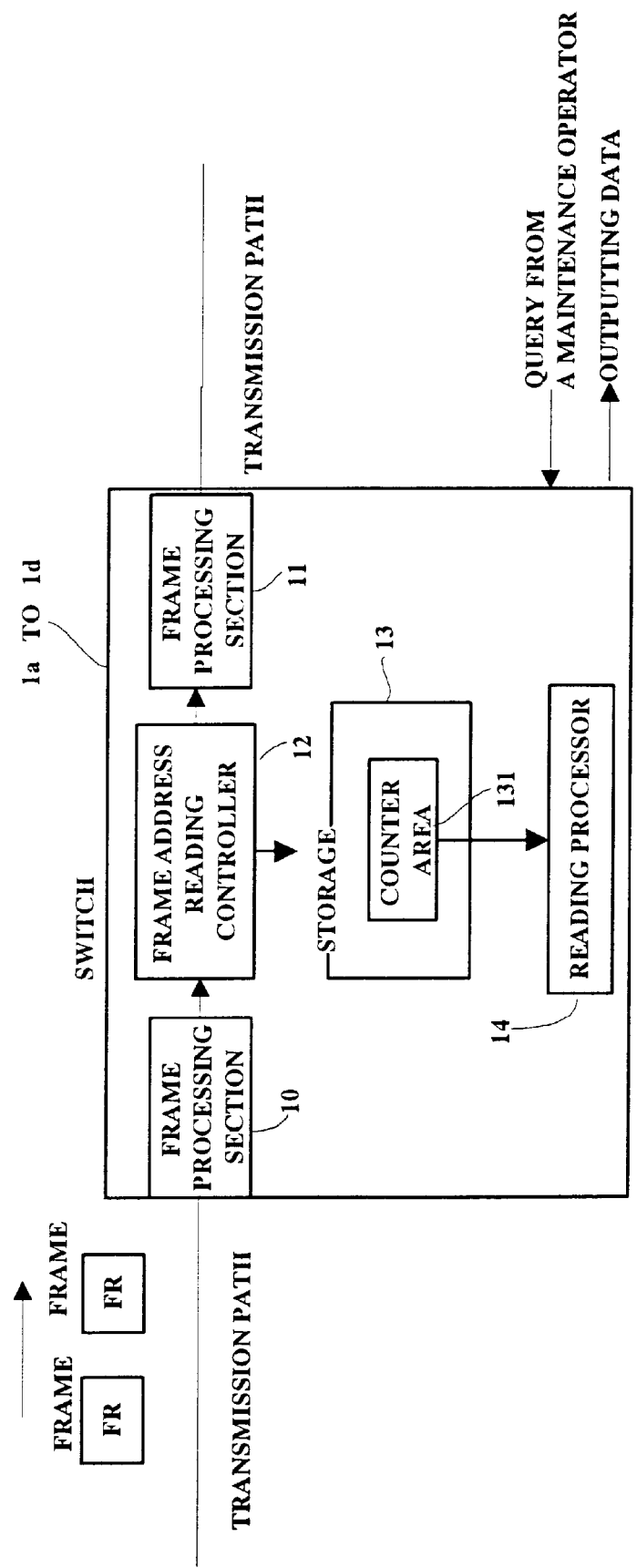

FIG. 12 is a block diagram of a second structural example of a switch on a network illustrated in FIG. 7.

Figure 13:
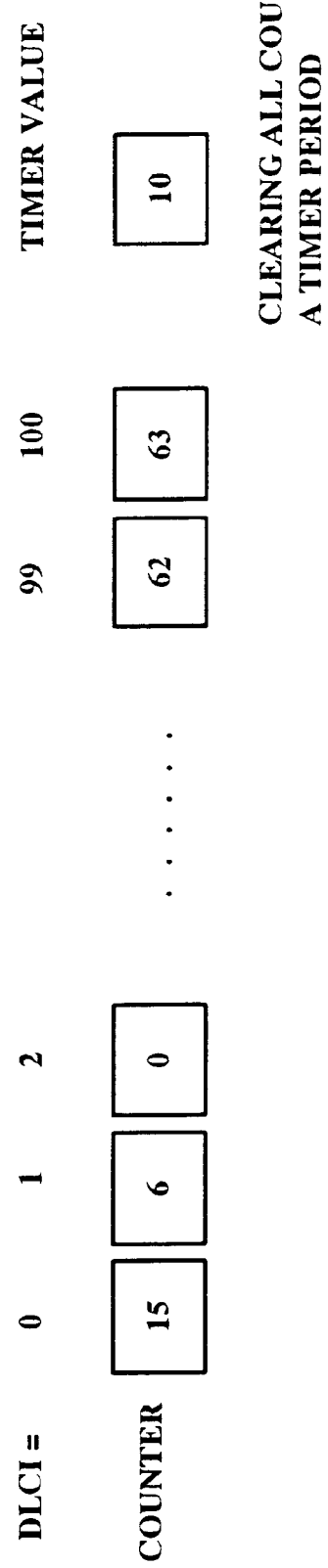

FIG. 13 illustrates an example of contents of a counter area of a storage on a structure illustrated in FIG. 13.

Figure 14A:
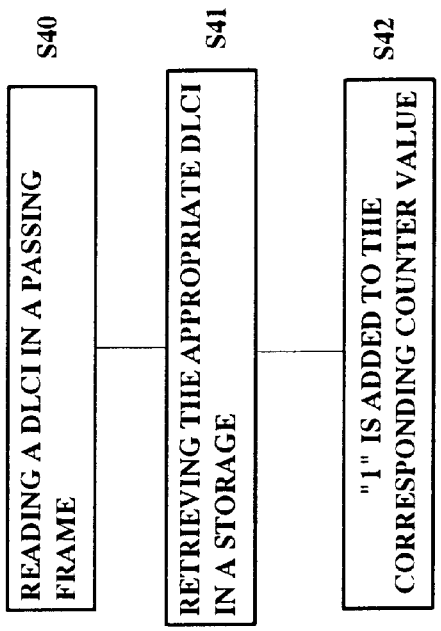
Figure 14C:
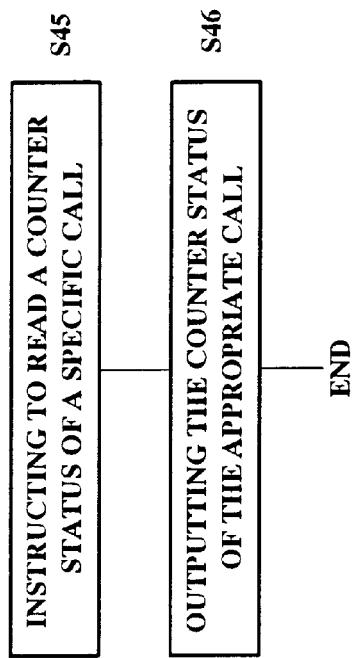
Figure 14B:
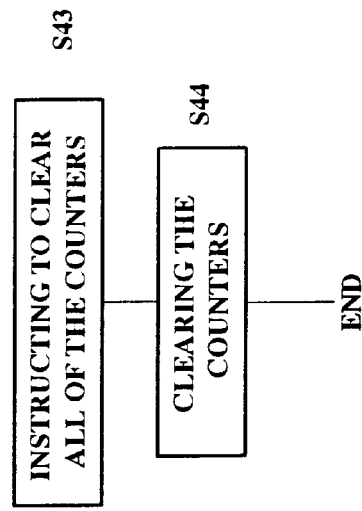

FIGS. 14A to 14C show operational flowing charts in a switch on a structure shown in FIG. 13.

Figure 15:
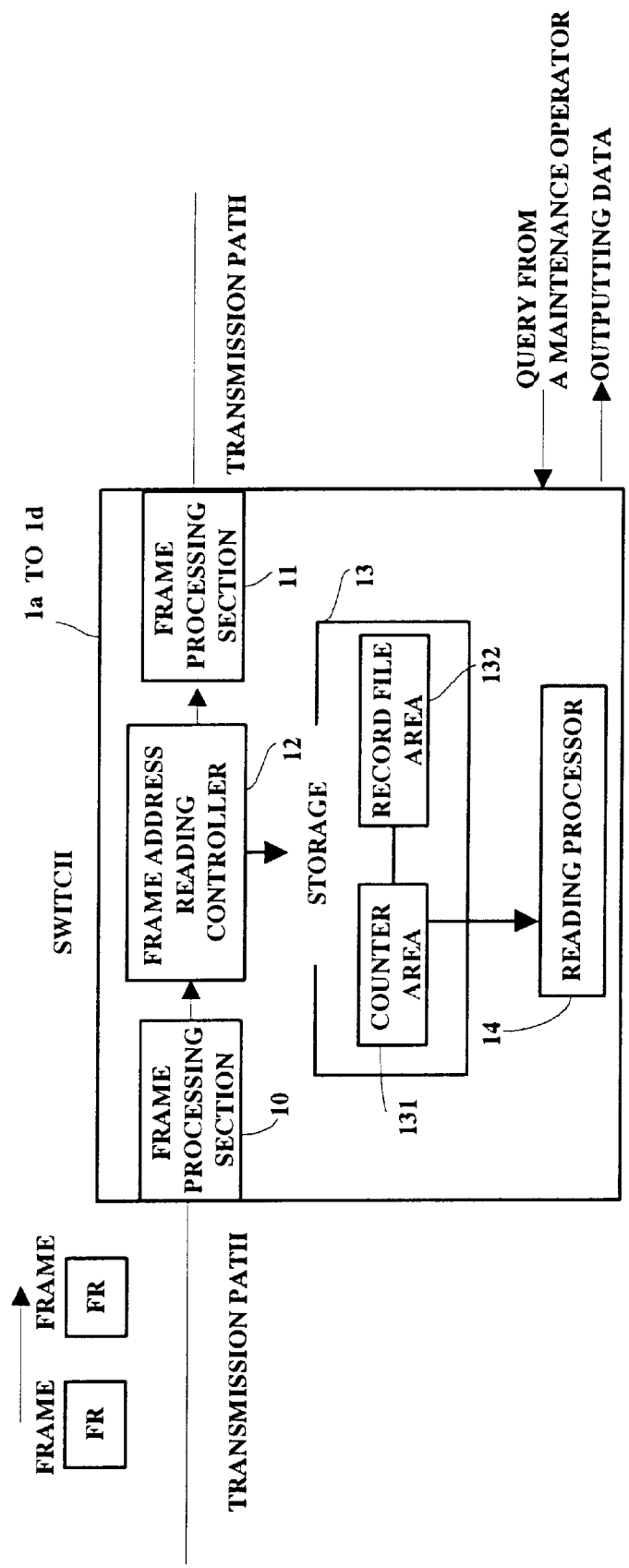

FIG. 15 is a block diagram of a third structural example of a switch on a network illustrated in FIG. 7.

FIGS. 16A to 16C show operational flowing charts in a switch on a structure shown in FIG. 15.

Figure 17:
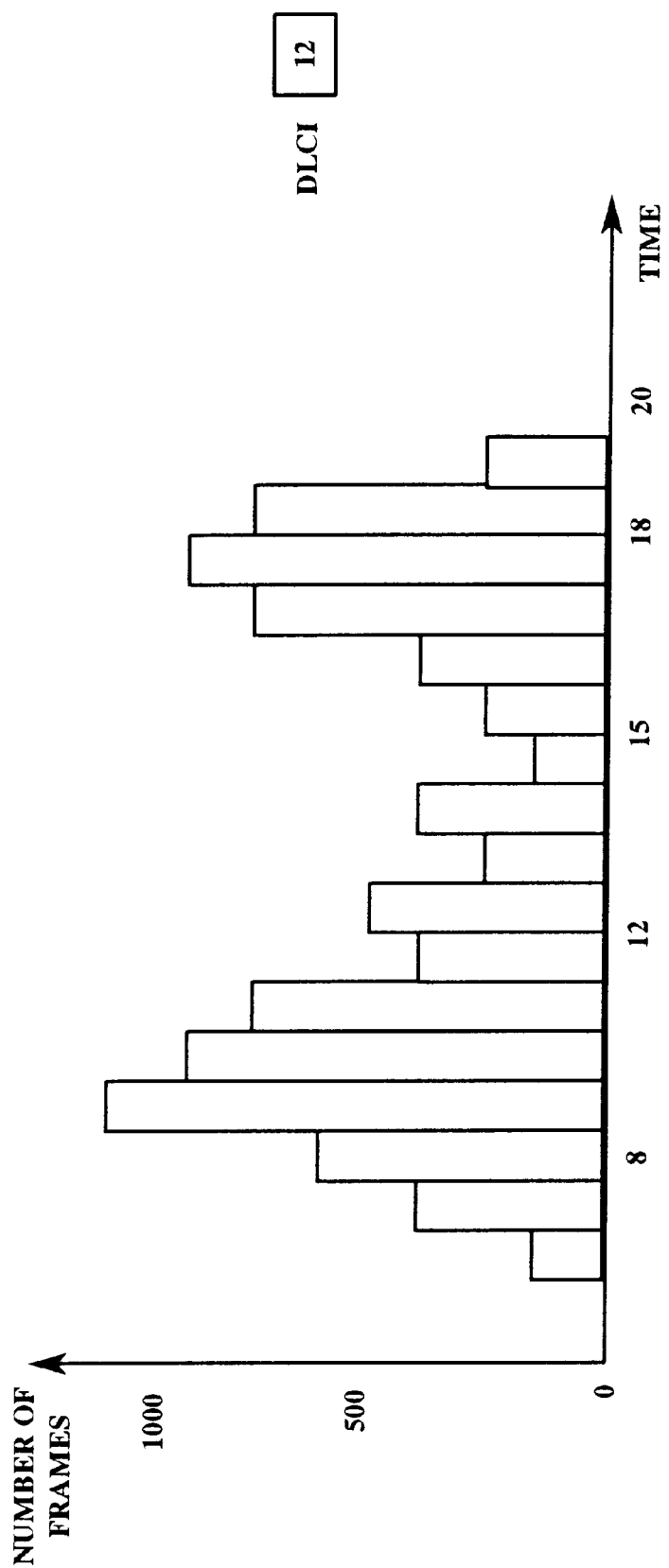

FIG. 17 shows an example of a time series output of a specific path collected in a switch.

Figure 18:
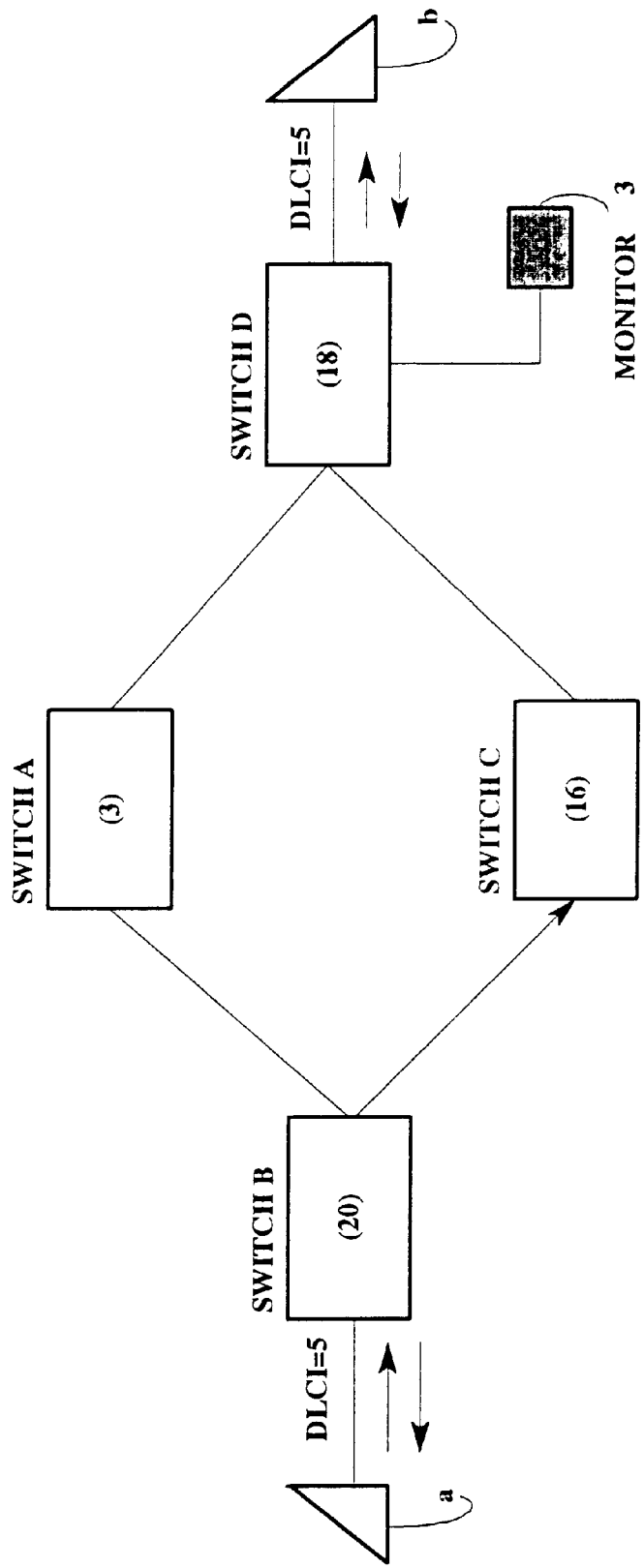

FIG. 18 is a diagram showing a first structural example of a network connecting a monitor.

FIG. 19 illustrates an example of outputting network passing frames collected in a monitor shown in FIG. 18.

Figure 20:
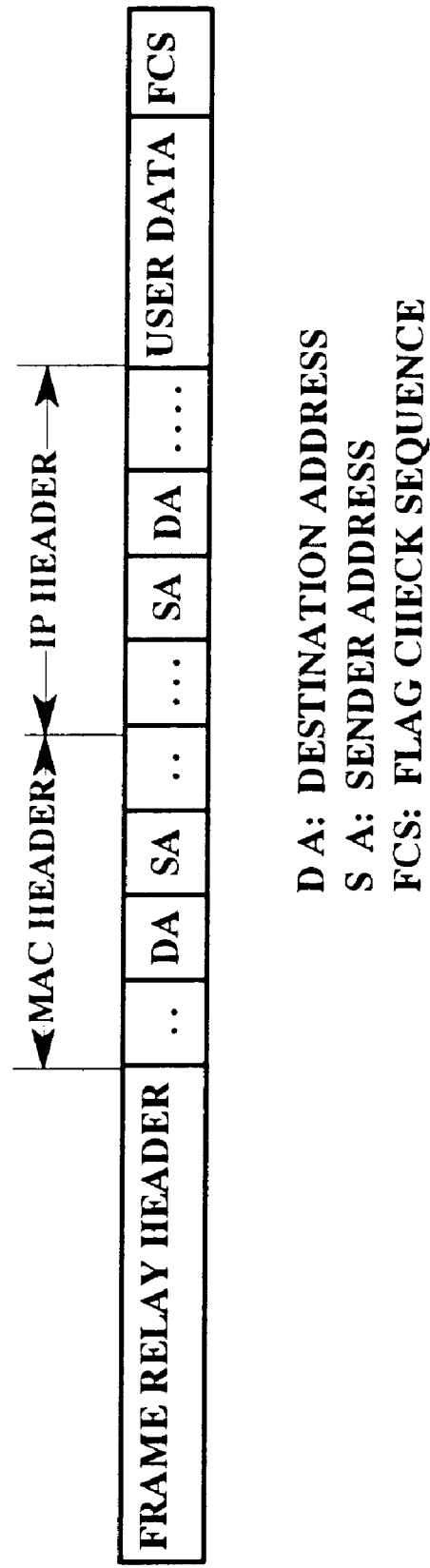

FIG. 20 illustrates a communication format of TCP/IP protocol on repeating a frame relay.

Figure 21:
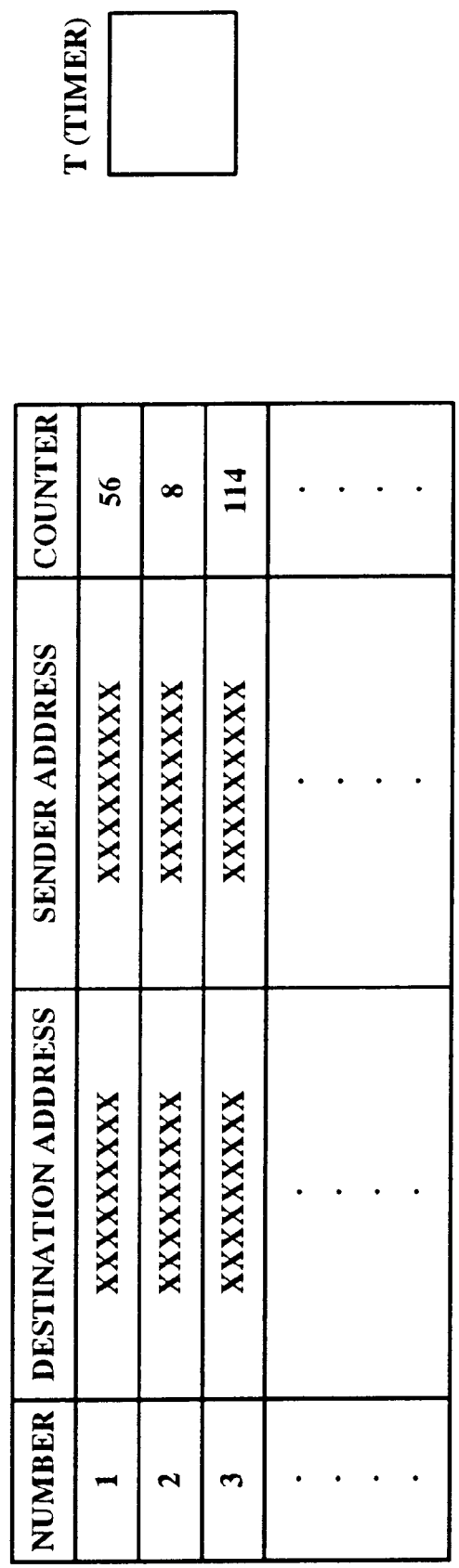

FIG. 21 shows an example of contents of a table of a storage in a communication device on a network structure shown in FIG. 18.

FIGS. 22A to 22C show operational flowing charts in a switch on a network structure shown in FIG. 18.

FIGS. 23A to 23C show operational flowing charts in a switch on a network structure shown in FIG. 18 (when writing a counter value to a table).

Figure 24B:
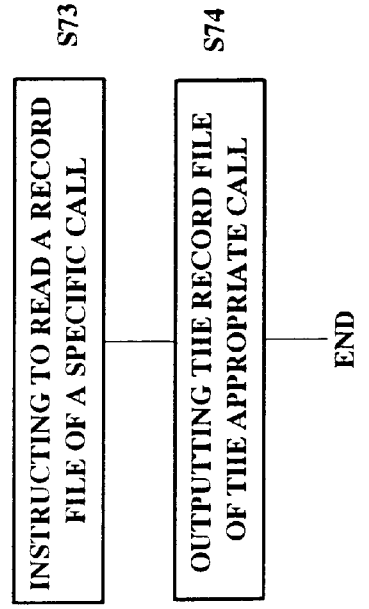
Figure 24A:
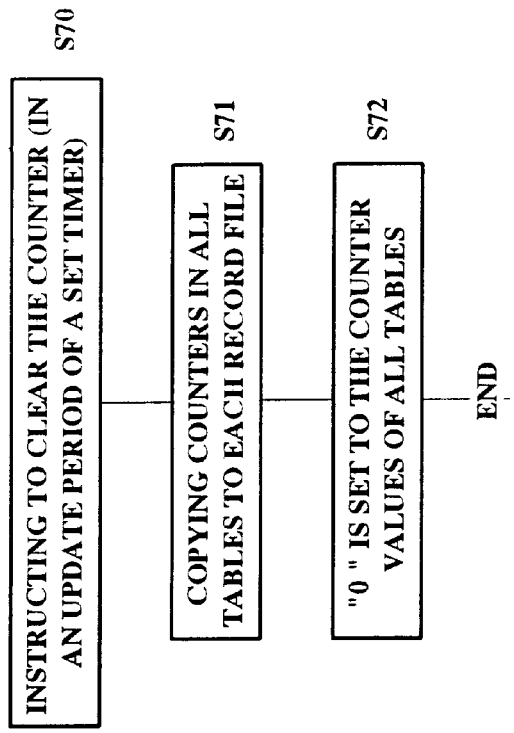

FIGS. 24A to 24B show operational flowing charts in a switch on a network structure shown in FIG. 18 (when writing a counter value to a storage file).

Figure 25:
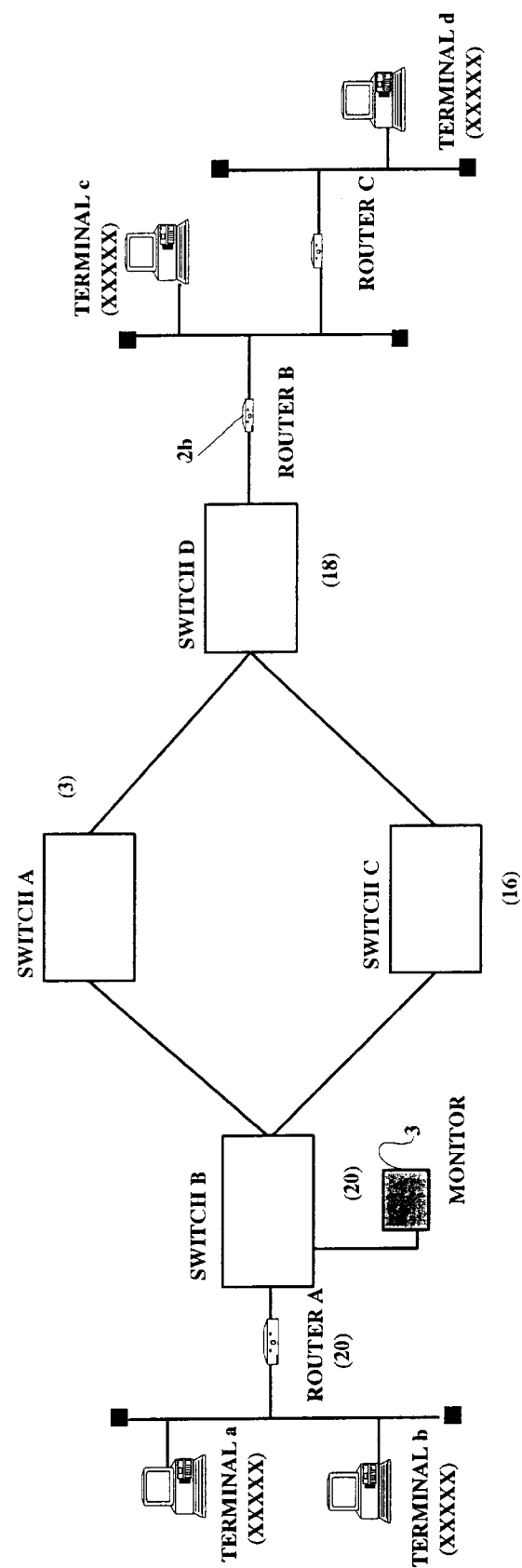

FIG. 25 shows a second structural example of a network connecting a monitor.

FIG. 26 shows an example of querying and outputting from a monitor.

Figure 27:
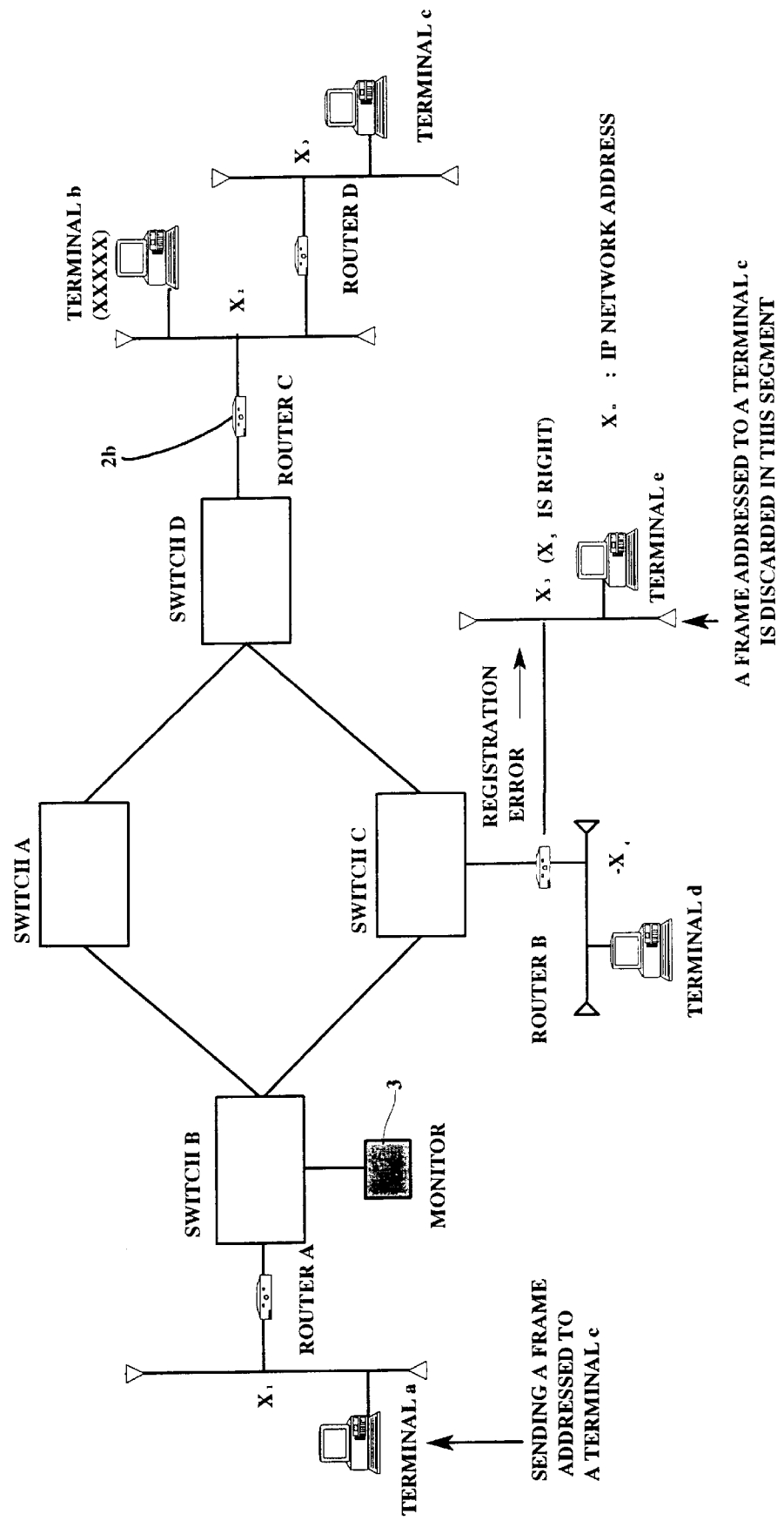

FIG. 27 shows an applied example of the present invention on a TCP/IP communication network.

DESCRIPTION OF THE PREFERRED EMBODIMENTS

Embodiments according to the present invention will be now explained in accompanying with attached drawings. Throughout the description, the same reference numerals or symbols are used to denote and identify corresponding or identical components.

Before explaining the detailed embodiments of the present invention, a principle of the present invention will be now explained for ease understanding.

(29)

In the present embodiments, each communication device on a data communication network includes different function depending on whether a communication protocol to be subject of the present invention is of connection-oriented or connection-less communication.

In the case of connection-oriented communication, communication is facilitated by registering a communication path to each communication device in advance. On the contrary, in the case of connection-less communication, communication is facilitated by identifying a frame having sender and destination addresses in each communication device.

In the case of connection-oriented communication, a flag area of one bit is provided per a communication path information on a storage of a communication device. When passing a frame through the communication device, a flag corresponding to the appropriate communication path is set in reference to an address field of the frame.

For example, as shown in FIG. 1, flags of the communication paths in the storage are set from 0 to 1 in flag areas of a storage.

Figure 2:
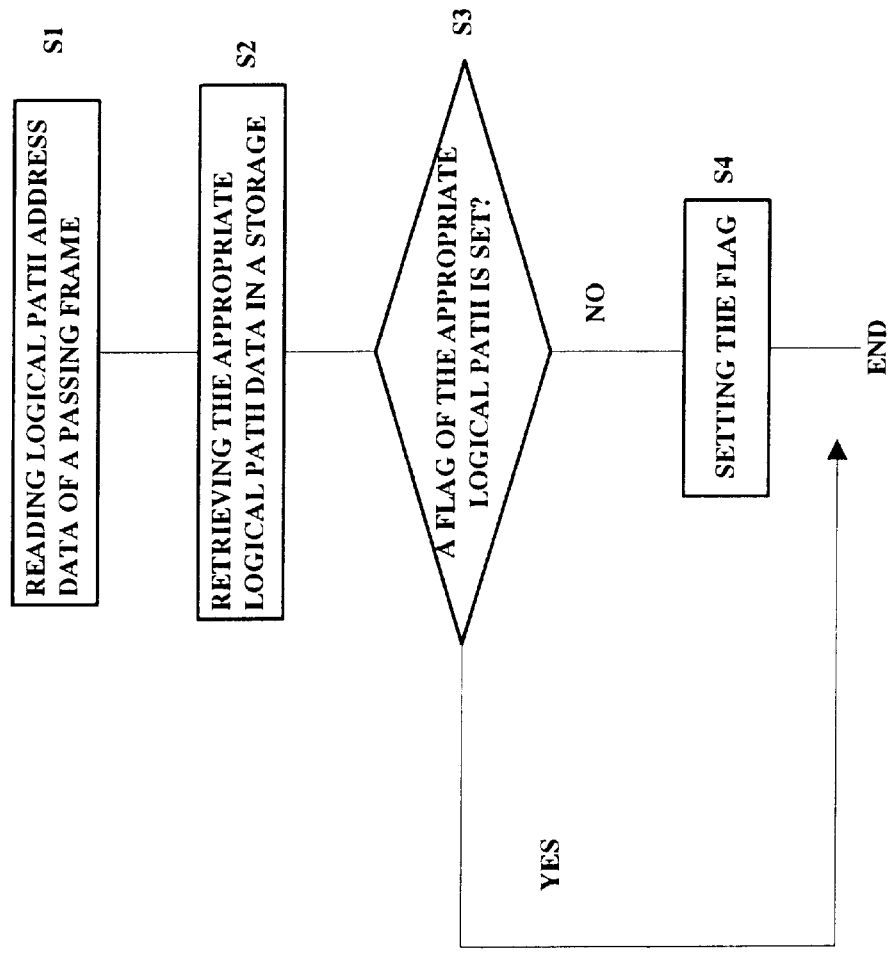
FIG. 2 shows an operational flow chart on passing frames through a communication device.

FIG. 2 shows an operational flowing chart on passing a frame through the communication device. At first, logical pass address information of a passing frame is read out (STEP S1). Next, the appropriate logical path information in the storage is retrieved (STEP S2).

It is judged whether or not a flag of the appropriate logical path is set (STEP S3). When the flag is already set, this step is finished here. If the flag is not set, the flag is set from 0 to 1 (STEP S4).

(35)

In a predetermined initial operation, all flags are set from 1 to 0 according to an instruction of clearing flags.

(36)

It is also possible to have reading and outputting functions in the communication device by querying the status of a flag corresponding to a specific communication path information.

On the other hand, in a case of the connection-less communications, a table for writing sender and destination addresses of a passing frame is provided on the storage of the communication device.

FIG. 3 shows one example of contents of the table. When passing a frame through the communication device, frame addresses are read out, and fields of the sender and destination addresses are written on the table as shown in FIG. 3, in reference to the field of the sender and destination addresses of the frame.

Further, all of the address information written in the table is cleared by an instruction for clearing addresses in the table. It is also possible to have reading and outputting functions in the communication device by querying whether or not there is address information corresponding to the specific communication path information on the table.

In the case of the connection-oriented communications, it is possible to provide a counter area per communication path information registered corresponding to a flag area.

Figure 4:
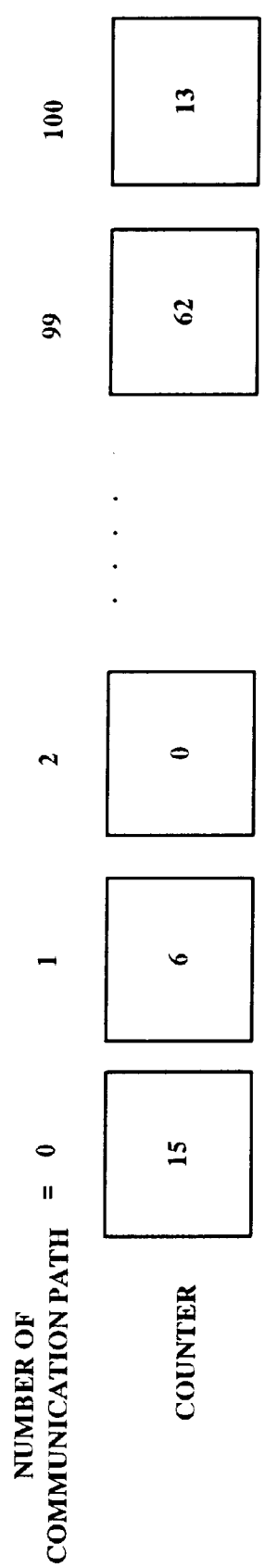
FIG. 4 shows an example of an counter area in a storage.
Figure 5:
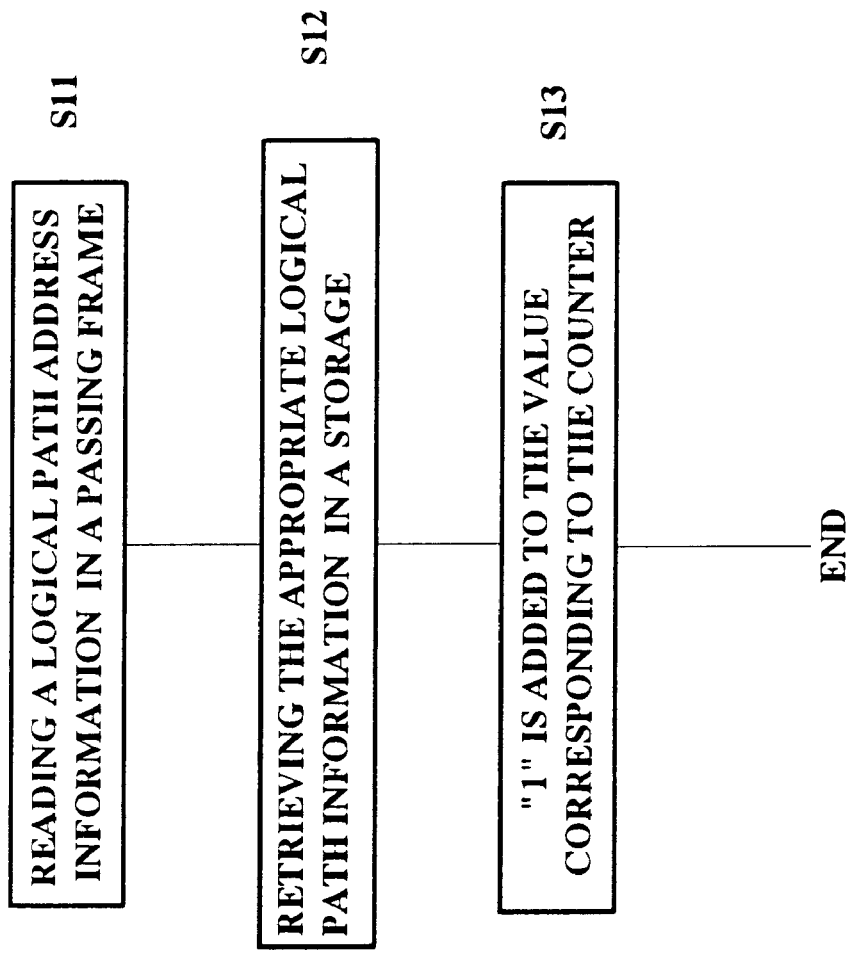
FIG. 5 shows an operational flowing chart of a switch on passing frames through a communication device.

FIG. 4 shows one example of a counter area in a storage in this case. FIG. 5 shows an operational flowing chart in the communication device. When passing the frame through the communication device, the logical path address information in the passing frame is read out (STEP S11). Next, the appropriate logical path information is retrieved in reference to an address field of the frame (STEP S12). Then, "1" is added to a value of the counter area corresponding to the communication path (STEP S13).

This function can be also applied to the connection-oriented communications. It is also possible to provide a counter area in a table corresponding to the sender address and the destination address by extending the table shown in FIG. 3.

It is further possible to have a function for clearing the counter (returning to zero) and functions for reading and outputting the counter corresponding to the specified logical path.

Figure 6:
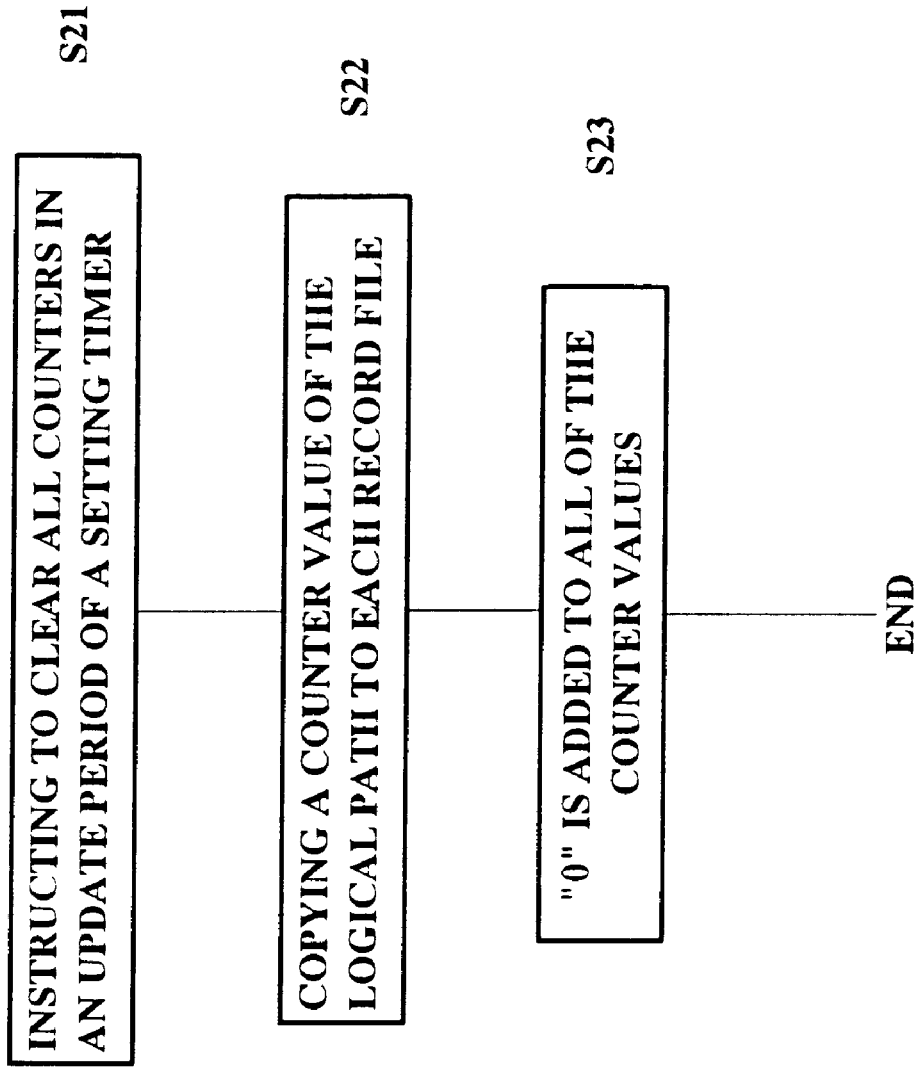
FIG. 6 shows an operational flowing chart on clearing a counter area in a storage.

FIG. 6 shows an operational flowing chart in this case. This structure has a timer function for periodically clearing the counter and a record file area for storing the counter value in time series.

It is possible to optionally set the timer. All counters are cleared in a timer period (STEP S21). The numbers of the passing frames accumulated in the counter before clearing is copied to each of the record files (STEP S22), and the contents of the file can be read out. After copying to the record file, the previous counter values are cleared (are returned to zero) (STEP S23).

In accordance with the present invention, it is also possible to set a monitor for monitoring each communication device in a network remotely, and collect a record file corresponding to the numbers of the passing frames of a specific communication from the monitor for a communication device having the above-described functions. Then, it becomes possible to obtain the amount of traffics according to the numbers of the collected passing frames.

Embodiments according to the above-described principle of the present invention will be now explained.

FIG. 7 shows a block diagram of an embodiment applying the present invention to each communication device on the structure of LAN-WAN-LAN on a data communication network employing a logical multiplexing method.

In FIG. 7, switches 1a to 1d and routers 2a and 2b are defined as communication devices. Each protocol can be applied as a communication protocol by specifying an address field section of a frame format.

An applied example according to the present invention will be now explained when repeating a frame relay between routers 2a and 2b of inter-LANs communication and switches 1a to 1d on WAN with the use of TCP/IP protocol communication.

[AN EMBODIMENT IN THE CASE OF REFERRING A FRAME RELAY DLCI ON EXCHANGES]

The switches 1a to 1d on the network shown in FIG. 7 includes a structure illustrated in FIG. 8 as communication devices applied to the present invention. The routers 2a and 2b shown in FIG. 7 have the same structure as those of the switches.

In FIG. 8, the structure are commonly used to the switches 1a to 1d, in which a frame processing section on a receiver for receiving a frame relay signal FR from a transmission path and a frame processing section 11 on a sender for sending the frame relay signal FR to the transmission path are included.

The structure also includes a frame address reading controller 12 for reading the frame address of the frame relay signal FR received in the frame processing section 10 on the receiver, a storage 13 and a reading processing section 14.

Figure 9:
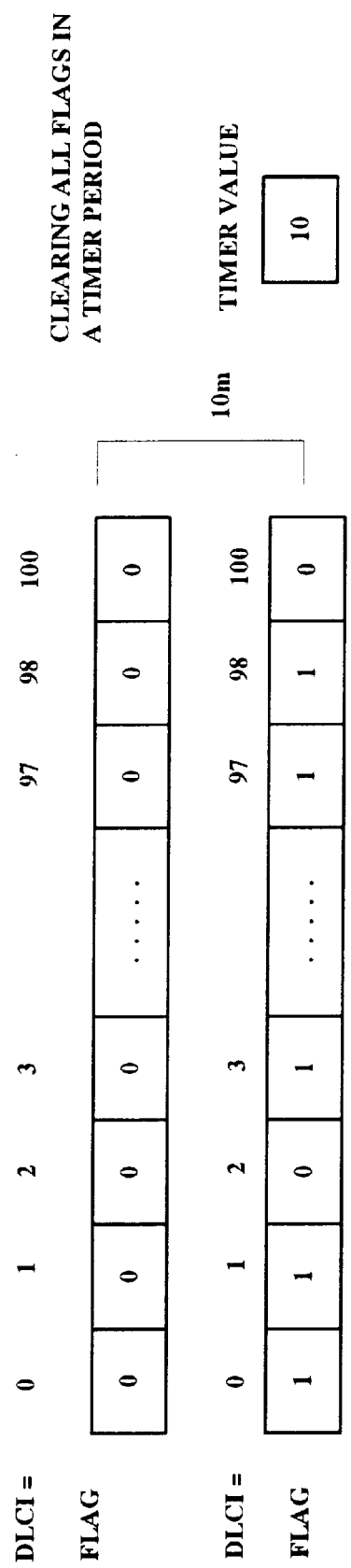
FIG. 9 illustrates an example of contents of a flag area in a storage on a structure illustrated in FIG. 8.

A flag area 130 of one bit is provided on the storage 13 per a DLCI corresponding to a PVC (Path Virtual Channel) registered in advance as described in FIG. 9.

In the above-described structure, the frame address reading controller 12 refers the DLCI in an address field A of the frame format illustrated in FIG. 10 on passing the frame according to an operational flowing chart in the exchange shown in FIG. 11 (refer to FIG. 11A: STEP S30).

Then, the appropriate DLCI flag in the flag area 130 of the storage 13 is retrieved (STEP S31), and it is judged whether or not the appropriate DLCI flag is set (STEP S32).

When the DLCI flag is "0", a flag corresponding to the DLCI shown in FIG. 9 is set. That means the flag is set from "0" to "1" (STEP S33).

Further, in FIG. 8, a maintenance operator instructs to clear the flag is given through the reading processor 14 (refer to FIG. 11B: STEP S34). Then, the flag area 130 of the storage 13 is cleared (STEP S35).

When the maintenance operator instructs to read a flag of a specific call is given to the reading processor 14 (refer to FIG. 11C: STEP S36), the flag status of the appropriate call is outputted through the reading processor 14 (STEP S37).

FIG. 12 shows an example in which a counter area 131 is provided as shown in FIG. 13 instead of the flag area 130 of the storage 13 on the structure of the switches 1a to 1d in FIG. 8. An operational flowing chart of the switches is shown in FIG. 14.

A counter area 131 is provided per a DLCI to refer the DLCI in the frame on the frame address reading controller 12 when passing the frame (refer to FIG. 14A: STEP S40). The appropriate DCLI is retrieved (STEP S41), and "1" is added to the value of the counter area 131 of the appropriate DLCI as shown in FIG. 13 (STEP S42).

All counters are cleared in the counter area 131 according to the period of the set timer value (=10 seconds). The maintenance operator instructs to clear all of the counters (refer to FIG. 14B: STEP S43), and the counters are cleared (STEP S44). When an instruction for calling a counter status of the specific calls is given by the maintenance operator (FIG. 14C: STEP S45), a counter status of the appropriate call is outputted from the reading processor 14 (STEP S46). (63)

FIG. 15 shows an embodiment in which a record file area 132 is provided along with a counter area 131 in a storage 13 of a switch. In this case, numbers of the passing frames of all DLCIs accumulated before clearing the counter area 131 is copied and stored to each record file area 132. Additionally, when querying specific communication information to the exchange, the information is read and outputted from the record file area 132 in time series.

The operational flowing chart in this case is shown in FIG. 16. When periodically giving an instruction for clearing the counter (FIG. 16A: STEP S50), the counters of all DLCIs are recorded and stored in each record file area 132 (STEP S51). After then, all counter values are set to "0" (STEP S52).

On the contrary, when the maintenance operator queries specific communication information to the exchange (FIG. 16B: STEP S53), the record information of the appropriate call is read from the record file area 132, and outputted from the reading processor 14 in time series (STEP S54).

FIG. 17 shows an example of a result of outputting a file in time series from the reading processor 14 by processing the record information. The value obtained by counting the number of the frames is outputted. The record is used for improvement of system operation.

FIG. 18 shows an embodiment in which a monitor for monitoring each communication device in a network applied to the present invention from a remote place is set and connected to the exchange. In this example, information for passing a specific communication, for example, DLCI =5, between terminals a and b, is queried from the monitor 3 to the communication device having the above-explained functions.

As the example for outputting the numbers of the passing frames collected in the monitor shown in FIG. 19, the record file information accumulated in the above-described record file area 132 (refer to FIG. 15) in each exchange A to D is collected and the numbers of the passing frames of the appropriate DLCIs are outputted. Thereby, it is possible to obtain an operational status of the system.

In the data communication network employing a logical multiplexing method as shown in FIG. 7, the present invention is applied to each communication device on a structure of LAN-WAN-LAN. In here, switches and routers are defined as communication devices. Various kinds of communication protocols can be applied by specifying an address field section of a frame format.

An applied example of the present invention when repeating a frame relay between the routers of inter-LANs communication and the switches on WAN with the use of TCP/IP protocol communication.

[AN EMBODIMENT FOR REFERRING SENDER AND DESTINATION ADDRESSES IN AN EXCHANGE]

An embodiment will be now explained in which a MAC or IP header section in a passing frame is referred, and the sender and destination addresses are identified in the exchange on the network shown in FIG. 7.

FIG. 20 shows an example of a frame format of TCP/IP protocol communication on repeating the frame relay. Each of the MAC and IP header sections include a destination address DA and a sender address SA.

In FIG. 23, an operational flowing chart in the exchange in this case is shown. The frame address reading controller 12 in each of the switches 1a to 1d shown in FIG. 7 refers the MAC or IP header section of the frame on passing the frame (FIG. 22A: STEP S60).

A table area shown in FIG. 21 is provided in the storage 13 to distinguish the existence of the appropriate communication, i.e., the sender address is corresponding to the destination address, in this table (STEP S61). When there is no appropriate communication, the sender and destination addresses are written in a table as shown in FIG. 21 (STEP S62).

The maintenance operator instructs to clear information in a table (FIG. 22B: STEP S63), or instructs to read information of a specific call (FIG. 22C: STEP S65) from a console terminal so that counter information in the table is cleared in each exchange (STEP S64), and the existence of the appropriate call in a table is outputted (STEP S66).

According to the operational flowing chart of the exchange shown in FIG. 23, when "1" is added to the value of the counter area of the sender and destination addresses of the appropriate communication (FIG. 23: STEP S67) on passing the frame, the appropriate counter value is written to a table of the storage area 13 as shown in FIG. 21.

The maintenance man instructs to clear information in the table (FIG. 23B: STEP S63), or instructs to read information of a specific call (FIG. 23C: STEP S65) from the console terminal so that the counter information in a table is cleared in each exchange (FIG. 23B: STEP S64), and a counter status of the appropriate call is outputted (FIG. 23C: STEP S66).

When recording the counter value as shown in FIG. 21, a timer should be specified for periodically clearing the counter. It is possible to optionally set the timer. The exchange generates an instruction for clearing all counters in a period of the set timer according to an operational flowing chart shown in FIG. 24 (FIG. 24A: STEP S70), and the numbers of the passing frames accumulated in the counter before clearing is copied to each record file (STEP S71). After that, the counter value is reset to "0" (STEP S72).

When the maintenance operator instructs to read a record file of the specific call (FIG. 24B: STEP S73), the record file of the appropriate call is read and outputted through the reading processor 14 (STEP S74).

As shown in FIG. 25, when the terminals a to d connect a monitor 3, which monitors from a remote place, to a network connected through the switches A to D and the routers A to C, which are used as communication devices, the monitor 3 queries the accumulated information by specifying the sender and destination addresses to each communication device in the network.

FIG. 26 shows an output example for querying from the monitor 3 on communicating from the terminal b to the terminal c in this case. The numbers of the passing frames of the sender and destination addresses obtained from the MAC or IP address are obtained per a communication device.

[AN APPLIED EXAMPLE FOR MEETING WITH A FAULT GENERATED ON SETTING AN IP ADDRESS]

An advantageous point will be now considered in accompanying the above-described embodiments in the case where the present invention as explained in detail is applied to meet a fault caused when setting the IP address.

Even if each communication device is normally operated when structuring a large scale of a LAN network, it is rather large to generate a fault such that the communications cannot be facilitated for practical use according to an artificial mistake of complex address setting, such as a MAC or network address.

For example, when an IP network address of a segment connected to a router B on a structure of a TCP/IP communication network shown in FIG. 27 is registered to a router, the case where $X_3$ instead of $X_5$, which is correct, inadvertently registered with overlapping a LAN connected to a router D will be considered.

When sending data from the terminal a to the terminal c, the router A can obtain a shortest route to the $X_3$ segment by referring the routing table inside of the router. Then, as the number of hops of a route from the router A to the router B is larger than that of a route of passing through the routers C and D, the router A sends the frame addressed to the $X_3$ segment to the router B.

Since the router A recognizes the $X_5$ segment as the $X_3$ segment, the router A queries the MAC address corresponding to the destination IP address sent on the $X_5$ segment. However, the reply is not returned because there is no address. Therefore, all frames addressed to the terminal c will be discarded.

Accordingly, it is necessary to research to where the appropriate communication frame is passed as cutting and dividing a fault which causes impossibility of communications. In this case, the monitor 13 queries network passing history information of the appropriate communication by applying to the present invention. Thereby, user data of which flag is set in the router A, the exchange B, the exchange C and the router B can be obtained. Thus, it is possible to obtain the misregistration of the network address according to the abnormal communication routing.

As described above, according to the present invention, it becomes possible to simply obtain the existence of the specific communication on the connection-oriented communication of data exchange network employing the logical multiplexing method. It is, further, possible to collect data with low cost compared with the conventional line tracer and analyzers, and without high data analyzing technique because of the use of a storage in a communication device.

Additionally, it becomes possible to obtain the existence of data communication in a real time by controlling the timing for clearing the collected information.

It is also possible to simply obtain a specific call summarized traffic, obtain summarized traffic distribution information which is in time series per a communication call, and know a communication characteristic of an end user.

There is a case where a network designer or administrator can be obtain only the summarized traffic trend not accurate traffic information. According to the present invention, in even the case, it is simple to obtain efficient information when communication paths in entire network or band width design is reviewed.

Additionally, when a plurality of paths in a network are set in the connection oriented communications or the connection-less communications, it becomes simple to obtain which route the user data is actually passed in a network. Therefore, when communications are not facilitated in end users, it becomes possible to simply cut and divide faults by collecting history of passing the specific communication, thus realizing to rapidly cope with the faults.

If the conventional line tracer or analyzing function is employed, it becomes necessary to highly analyze data.

Therefore, the steps for operations will be increased and its cost becomes too expensive. According to the present invention, as the history of passing the specific frame can be obtained simply, it is possible to specify the causes of the faults and rapidly cope with the faults.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing descriptions and all changes which come within the meaning and range of equivalency of the claims are therefore intended to be embraced therein.

What is claimed is:

1. A communication status confirmation system employing user data on a communication network transmission path employing a logical multiplexing method; and
    a plurality of data communication devices connected to the transmission path each of the plurality of data communication devices having;
        first means for reading logical path information in a passing user data frame;
        second means for setting a flag indicating the presence of the user data frame, for each logical path information; and
        third means for confirming data flowing in each communication path according to a status of the flag set by the second means.

2. The communication status confirmation system according to claim 1, wherein the flag set by the second means is cleared periodically in a predetermined period.

3. The communication status confirmation system according to claim 1,
    wherein said second means includes a counter per said logical path information and increments a value of an appropriate counter on passing the user data,
    a counter value of said appropriate counter is read from said first means, and
    a traffic amount actually communicated in each communication path is obtained according to the contents of the appropriate counter to be read.

4. A communication status confirmation system using user data on a communication network comprising:
    a transmission path employing a logical multiplexing method; and
    a plurality of data communication devices connected to the transmission path each of the plurality of data communication devices having;
        means for reading information of sender and destination addresses in a passing user data frame;
        means for storing passing data for each information of said sender and destination addresses read by the means for reading information; and
        means for reading passing data for each information of said sender and destination addresses from said storing means, and confirming data flowing in each communication path according to the passing data for each information of said sender and destination addresses.

5. The communication status confirmation system according to claim 4, wherein the passing data stored by said storing means is cleared periodically in a predetermined period.

6. The communication status confirmation system according to claim 4,
    wherein said storing means includes a counter per information of said sender and destination addresses and increments a value of an appropriate counter on passing user data, and
    the reading and confirming means reads a counter value of said appropriate counter from said storing means, to obtain a traffic amount actually communicated in each communication path according to the counter value.

7. The communication status confirmation system according to claim 3, further comprising:
    a record file for periodically recording a counter value corresponding numbers of transmitted frames per a logical path information which is counted from said counter,
    wherein said counter is cleared after copying the value to said record file to obtain for changing the number of frames in time series.

8. The communication status confirmation system according to claim 6, further comprising a record file for periodically recording a counter value corresponding to numbers of transmitted frames per information of said sender and destination addresses,
    wherein said counter is cleared after copying the value to said record file to obtain for changing the numbers of the frames in time series.

9. The communication status confirmation system according to claim 1, further comprising:
    a monitor for monitoring each communication device connected to a communication network from a remote place,
    wherein said monitor collects information of the same communication path read from said first means of each communication device through a plurality of communication devices to obtain a status of a specific communication path passing through said communication network.

10. The communication status confirmation system according to claim 8, further comprising:
    a monitor for monitoring each communication device connected to a communication network from a remote place,
    wherein said monitor collects information of the same communication path read from said information reading means of each communication device through a plurality of communication devices to obtain a status of a specific communication path passing through said communication network.

* * * * *